United States Patent
McElroy et al.

[11] Patent Number: 5,835,868
[45] Date of Patent: Nov. 10, 1998

[54] AUTOMATED SYSTEM FOR IMMOBILIZING A VEHICLE AND METHOD

[76] Inventors: Alejandro S. McElroy, 308 Westwood Plz., #426, Los Angeles, Calif. 90024; Jason Rauchfuss, 7913 La Fiesta Dr., Buena Park, Calif. 90620

[21] Appl. No.: 705,652

[22] Filed: Aug. 30, 1996

[51] Int. Cl.⁶ .................. G06F 17/00; G06F 7/00
[52] U.S. Cl. ................... 701/2; 701/70; 701/23; 340/426; 180/168; 318/587
[58] Field of Search .................. 701/2, 24, 33, 701/48, 70, 23, 93, 77, 98; 342/61, 71; 340/425.5, 426; 180/168, 170; 318/587

[56] References Cited

U.S. PATENT DOCUMENTS

| | | | |
|---|---|---|---|
| 3,631,694 | 1/1972 | Teroux | 70/202 |
| 3,974,713 | 8/1976 | Toohey . | |
| 4,076,095 | 2/1978 | Adamski | 180/114 |
| 4,881,615 | 11/1989 | Conway | 180/287 |
| 5,040,387 | 8/1991 | Knott, Jr. | 70/202 |
| 5,276,728 | 1/1994 | Pagliaroli et al. | 379/58 |
| 5,287,006 | 2/1994 | Carlo et al. | 307/10.3 |
| 5,307,048 | 4/1994 | Sonders | 340/426 |
| 5,323,140 | 6/1994 | Boyles | 340/428 |
| 5,335,748 | 8/1994 | Wilson | 180/270 |
| 5,359,868 | 11/1994 | Villani | 70/203 |
| 5,361,213 | 11/1994 | Fujieda et al. | 364/431.08 |
| 5,370,201 | 12/1994 | Inubushi | 180/287 |
| 5,382,948 | 1/1995 | Richmond | 340/825.36 |
| 5,392,030 | 2/1995 | Adams | 340/576 |
| 5,394,135 | 2/1995 | Stadler | 340/426 |
| 5,396,216 | 3/1995 | Morgan | 340/426 |

FOREIGN PATENT DOCUMENTS

| | | |
|---|---|---|
| 242099 | 4/1987 | European Pat. Off. . |
| 2266611 | 11/1993 | United Kingdom . |
| 2270547 | 3/1994 | United Kingdom . |

*Primary Examiner*—Jacques H. Louis-Jacques
*Assistant Examiner*—Gertrude Arthur
*Attorney, Agent, or Firm*—John S. Christopher

[57] ABSTRACT

An automated system for immobilizing a vehicle and method therefore typically employed in a motor vehicle for disabling the throttle and deploying the brake and clutch control systems after a theft of the vehicle has occurred is disclosed. The invention includes a plurality of devices for monitoring a plurality of parameters of the vehicle and for generating the triggering signal. A central control microprocessor is employed for receiving and analyzing the plurality of parameters and for detecting the triggering signal. A throttle adjustable range actuator module is utilized for disabling the throttle of the vehicle upon detection of the triggering signal. Finally, a brake adjustable range actuator module is included for deploying the brakes to stop the vehicle. Additionally, a clutch adjustable range actuator module is included for deploying a manual clutch, if the vehicle is fitted with one, for preventing the wheels of the vehicle from being driven. The plurality of vehicle parameters monitored include the vehicle speed, status of an audio power supply and vehicle sound system, state of external triggering devices, instructions imputed from a reset keypad, microprocessor control data received across a data link, and the state of a plurality of adjustable range actuator modules.

8 Claims, 8 Drawing Sheets

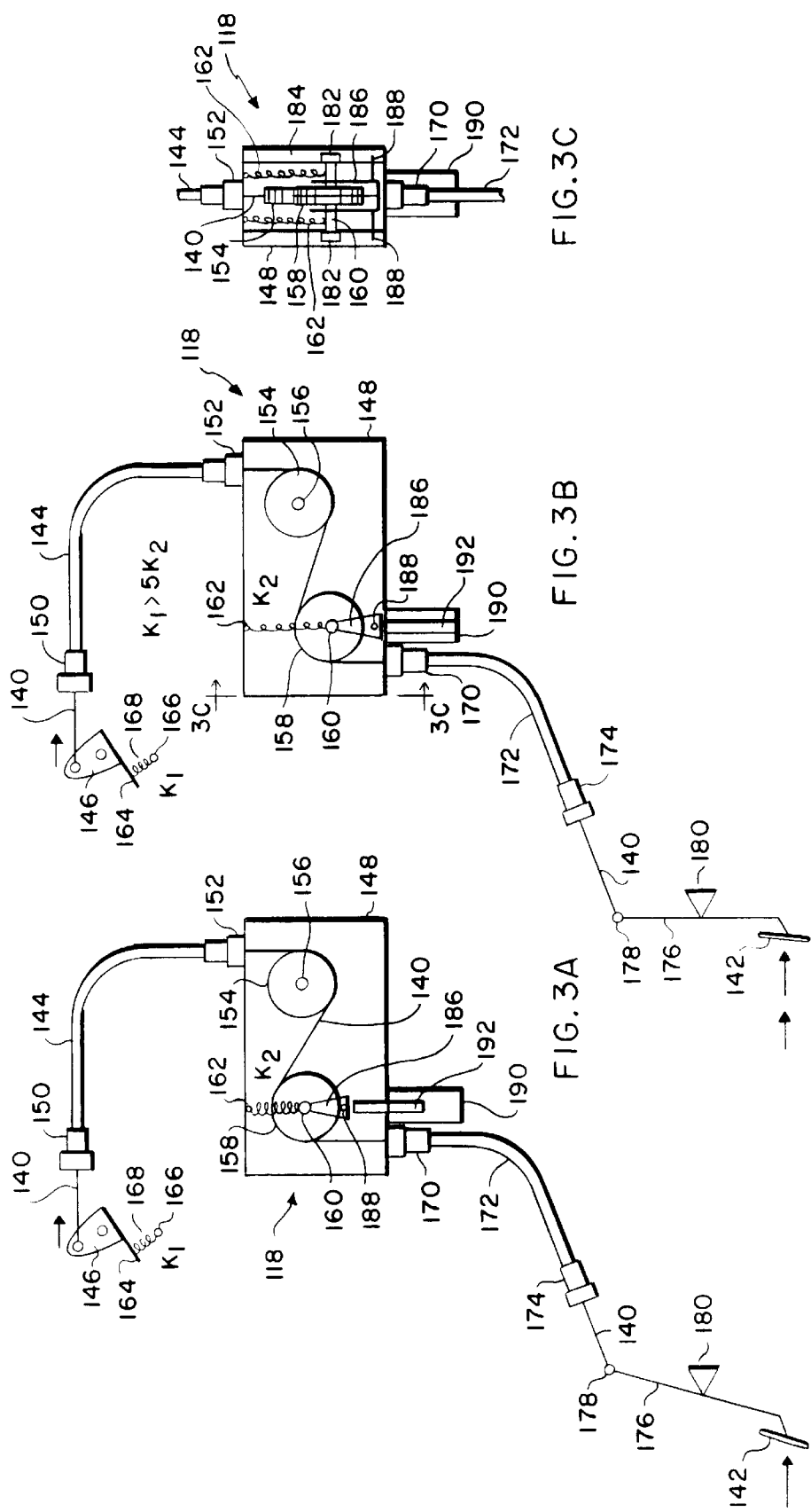

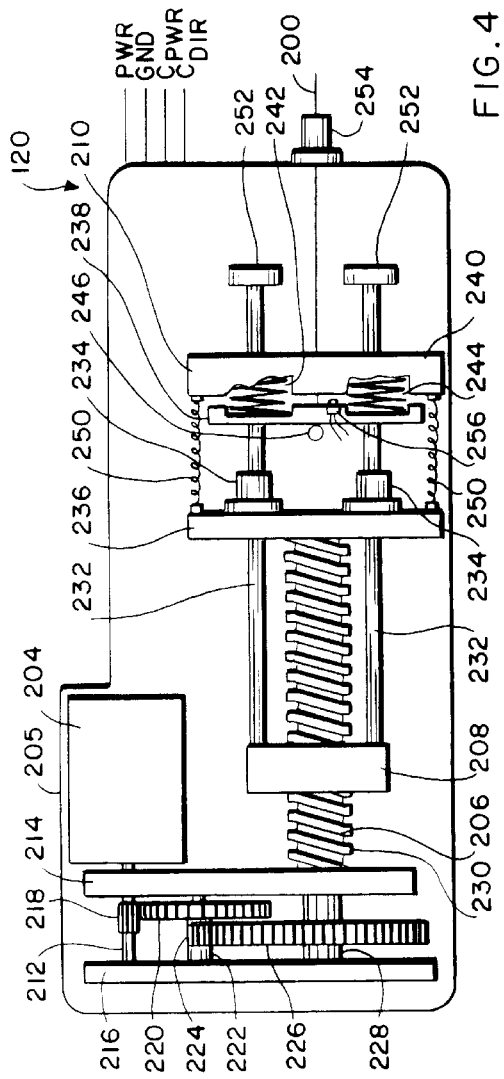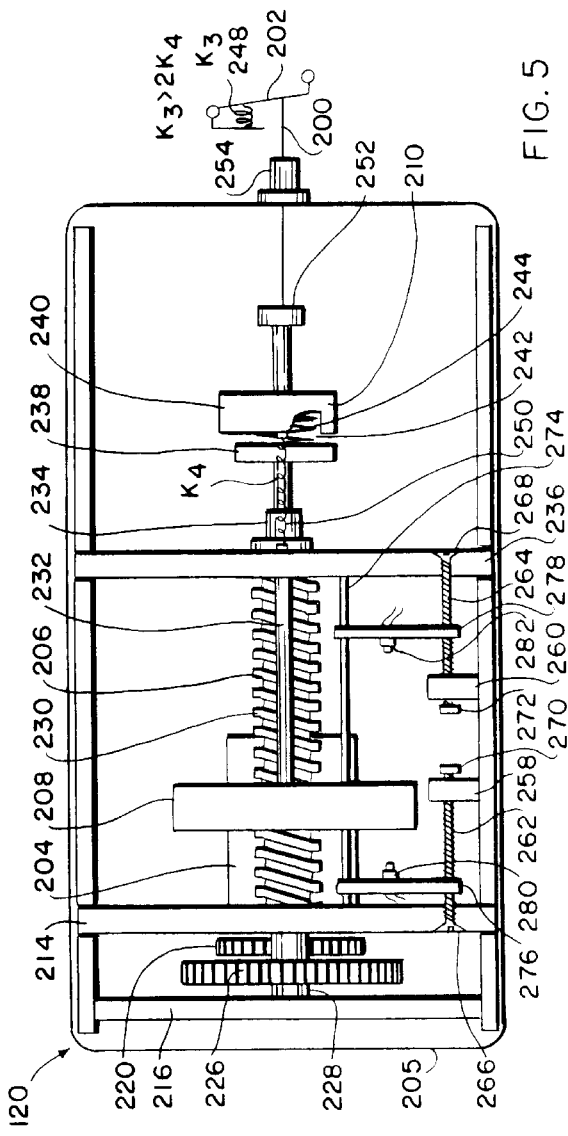

AUTOMATED SYSTEM FOR IMMOBILIZING A VEHICLE AND METHOD

BACKGROUND OF THE INVENTION

1. Field of the Invention

The present invention relates to vehicle security. More specifically, the present invention relates to methods and apparatus for an automated system for immobilizing a vehicle that disables the throttle and deploys the brake and clutch control systems of a stolen vehicle upon receipt of a triggering signal.

2. Description of the Related Art

Vehicle theft occurs at an alarming rate. Further, the theft of personal vehicles occurs whether the vehicle is occupied or not. The theft of an unoccupied vehicle is larceny. Unfortunately, thieves have become bolder in their actions and now steal vehicles while occupied by the owner thereof. The theft is consummated by the use of force or the threat of force and thus converts the larceny into robbery. This type of vehicle robbery has come to be known as carjacking.

Because of the increase in vehicle thefts, the vehicle security industry is thriving. The primary means of controlling access to a vehicle is through the door locks and the keyed ignition switch. For example, the door locks are usually controlled by a locking arrangement activated by a manual key or other remote means. Likewise, the position of the keyed ignition switch controls whether battery voltage is applied to the starter motor. In any event, such measures prevent casual theft by making it difficult to enter the vehicle by simply opening the door and starting the vehicle. Such vehicle security systems make it necessary to possess the ignition keys in order to successfully enter and start the vehicle.

Keyed entry and ignition systems are the oldest and most familiar means of vehicle security. Consequently, vehicle thieves are very familiar with these systems. Keyed entry and ignition systems, although useful, can be defeated by several known methods. One method utilizes an unlocking lever tool known in the art as a "slimjim" to overcome the door locks. Another method employs a suitable tool for punching, e.g., disabling, the door lock cylinders. Yet another method utilizes electrical jumper means to bypass the ignition switch, known as "hot-wiring", for placing battery voltage onto the vehicle starter motor.

Car alarm systems serve to detect a threat to the security of a vehicle and to initiate some action such as sounding an audible siren. These car alarm systems are intended to call attention to a breach in the security of the vehicle and to alert others as to the situation. Although audible alarms can be an deterrent, they are not effective in preventing vehicle theft when used alone. Further, because car alarm systems are in common use, passersby often ignore them when they are activated. Further, car alarms do not function to prevent a thief from gaining access to the vehicle and hot-wiring the ignition switch.

Steering wheel locks are a recent innovation designed to prevent a thief from driving the vehicle should he be successful in entering and starting it. Steering wheel locks can be of the type installed by the vehicle manufacturer or provided by an after-market manufacturer. New vehicle manufacturers are now providing steering wheel locking mechanisms which are typically mounted within the steering column. The lock is designed to prevent the steering wheel from being rotated when the ignition switch is not in the "on" position. However, manufacturer installed steering wheel locks can be accessed and defeated by forcing entry into the steering column within the vehicle and physically disabling the locking mechanism.

Steering wheel locks provided by after-market manufacturers are of several types. Some models connect a heavy steel shaft between the break pedal and the steering wheel to prevent turning the steering wheel and thus prevent steering the vehicle. Other models are mounted directly onto the steering wheel in such a manner that it becomes impossible to turn the steering wheel without removing the steering wheel locking mechanism. Vehicle thieves have been successful in defeating after-market manufactured steering wheel locking mechanisms by at least two methods. In the first method, the steering wheel is cut or sawed to form a gap in the circumference of the wheel which permits the removal of the steering wheel locking mechanism through the gap. In a second method, it is known to spray the metallic shaft of the steering wheel locking mechanisms with a super-cold freon mixture. If done properly, the metallic shaft then becomes brittle so that it can be broken by striking it with a hammer.

Other vehicle anti-theft systems have been known in the past. Examples of these systems include devices which control the vehicle door locks and fuel feed mechanism by use of a remote control signal. Such a remote control signal can be generated by a handheld transmitter which generates a radio frequency (RF) signal. The RF signals generated by the handheld transmitter are recognized by a receiver-decoder mounted in the vehicle which serves to toggle the control of the door locks and fuel feed mechanism upon the receipt of each RF signal. Another more fundamental vehicle anti-theft system is designed to isolate the ignition switch by the use of a second keying device. The second keying device serves to either (a) disconnect the switch from the battery source and/or starter motor, or (b) disable the fuel pump.

A more sophisticated vehicle anti-theft system which is electronic in nature is now being fitted in some new manufacturer vehicles. In this system, a small signal generator is built directly into the ignition key. Upon rotating the key to start the vehicle, the ignition key generator provides an identification signal to the starter circuit. If the identification signal is not present, the engine cannot be started. Thus, only the ignition key for that particular vehicle will start the engine and presumably the ignition cannot be hot-wired. It is noted that none of the above-identified vehicle anti-theft systems is effective in preventing the theft or assists in recovering the vehicle if the theft is accomplished by the use of a tow truck.

Another anti-theft system known in the art that was primarily designed to prevent the theft of vehicle wheels is known as the mercury balance switch. This system, which comprises a triggering mechanism containing liquid mercury free to flow between a set of terminals, is often employed to detect the imbalance of the vehicle. Thus, if the vehicle is jacked upward in an effort to steal the wheels, the mercury balance switch is triggered. This type of system might enjoy some success in helping prevent the theft of a vehicle by the use of a tow truck by sounding an audible alarm. Notwithstanding, none of the vehicle anti-theft systems disclosed hereinabove can prevent the theft of a vehicle by robbery, e.g., by carjacking. This is the case since a carjacker thief can steal the vehicle while the anti-theft systems are inactive and/or force the surrender of the ignition key and transmitter from the driver.

Another more recent innovation in vehicle security systems utilizes electronic tracking or homing transmitters/ receiver devices. In this system, a vehicle must be equipped with a special transmitter/receiver device prior to the theft. The transmitter/receiver device can be activated from a remote location without the knowledge of the thieves. The receiver portion of the anti-theft system is receptive to a fixed frequency signal transmitted by, for example, law enforcement authorities. The transmitter of the anti-theft system, once activated, quietly transmits a coded signal within a defined tracking area which can be intercepted and utilized by law enforcement personnel to track and locate the stolen vehicle.

Unfortunately, if the theft of the vehicle is not timely discovered and reported to law enforcement authorities, the vehicle can be removed from the defined tracking area. Under these conditions, the vehicle anti-theft system which employs the electronic tracking device is not useful in recovering the stolen vehicle. In additional, tracking devices do not prevent the thief from utilizing the stolen vehicle in a secondary crime which can endanger the public.

Thus, there is a need in the art for an improvement in vehicle anti-theft systems which both prevent or frustrate the theft of and assist in the recovery of a vehicle wherein the anti-theft system immobilizes the vehicle by disabling the throttle and deploying the brake and clutch control systems of the vehicle upon receipt of a triggering signal.

SUMMARY OF THE INVENTION

Briefly, and in general terms, the present invention provides a new and improved automated system for immobilizing a vehicle and method therefore embodying a novel apparatus for immobilizing a vehicle after a larceny or robbery of the vehicle (known as a carjacking) wherein the apparatus includes a plurality of features with each feature being utilized to disable or deploy a control system necessary to operate the vehicle.

The present invention is generally directed to an automated system for immobilizing a vehicle and method therefore and is typically employed in a motor vehicle for disabling the throttle and deploying the brake and clutch control systems after a theft of the vehicle has occurred. In its most fundamental embodiment, the automated system for immobilizing a vehicle comprises a construction incorporating a plurality of features including a first mechanism for monitoring a plurality of parameters of the vehicle and for generating a triggering signal. A control mechanism is included for receiving the plurality of parameters and for detecting the triggering signal. A second mechanism for disabling the throttle of the vehicle upon detection of the triggering signal and a third mechanism for deploying the brakes of the vehicle to stop it are also included.

In a preferred embodiment, the automated system for immobilizing a vehicle and method therefore includes a plurality of devices for monitoring the plurality of parameters of the vehicle and for generating the triggering signal. A central control microprocessor is employed for receiving and analyzing the plurality of parameters and for detecting the triggering signal. A throttle adjustable range actuator module is utilized for disabling the throttle of the vehicle upon detection of the triggering signal. Finally, a brake adjustable range actuator module is included for deploying the brakes to stop the vehicle.

In the preferred embodiment, the automated system for immobilizing a vehicle comprises structure for monitoring the plurality of parameters which include the speed of the vehicle, the status of an audio power supply and the vehicle entertainment sound system, the state of a plurality of external triggering devices such as a car alarm, instructions inputted into the central control microprocessor from a reset keypad, microprocessor control data received across a data link, and the state of a plurality of adjustable range actuator modules employed for controlling certain systems in the present invention.

In addition to the above mentioned features, the automated system for immobilizing a vehicle also includes a clutch adjustable range actuator module for deploying the manual clutch if the vehicle is fitted with one. When the manual clutch is deployed or depressed, the power train of the vehicle is interrupted. This condition prevents the wheels of the vehicle from being driven by the engine without disabling the engine.

These and other objects and advantages of the present invention will become apparent from the following more detailed description, taken in conjunction with the accompanying drawings which illustrate the invention, by way of example.

BRIEF DESCRIPTION OF THE DRAWINGS

FIG. 3A is a side elevational, view of a throttle adjustable range actuator module which is employed to automatically disable the vehicle throttle and is shown in the normal (non-deployed) state.

FIG. 3B is a side elevational view of a throttle adjustable range actuator module which is employed to automatically disable the vehicle throttle and is shown in the secure (deployed) state.

FIG. 3C is a cross-sectional view of the throttle adjustable range actuator module taken along the line 3C—3C of FIG. 3B showing the construction of the movable pulley.

FIG. 4 is a top planar view of a brake and/or clutch adjustable range actuator module utilized for automatically deploying the brakes and/or clutch of the vehicle.

FIG. 5 is a side elevational view of the brake and/or clutch adjustable range actuator module of FIG. 4 utilized for automatically deploying the brakes and/or clutch of the vehicle.

DESCRIPTION OF THE INVENTION

Figure 1:
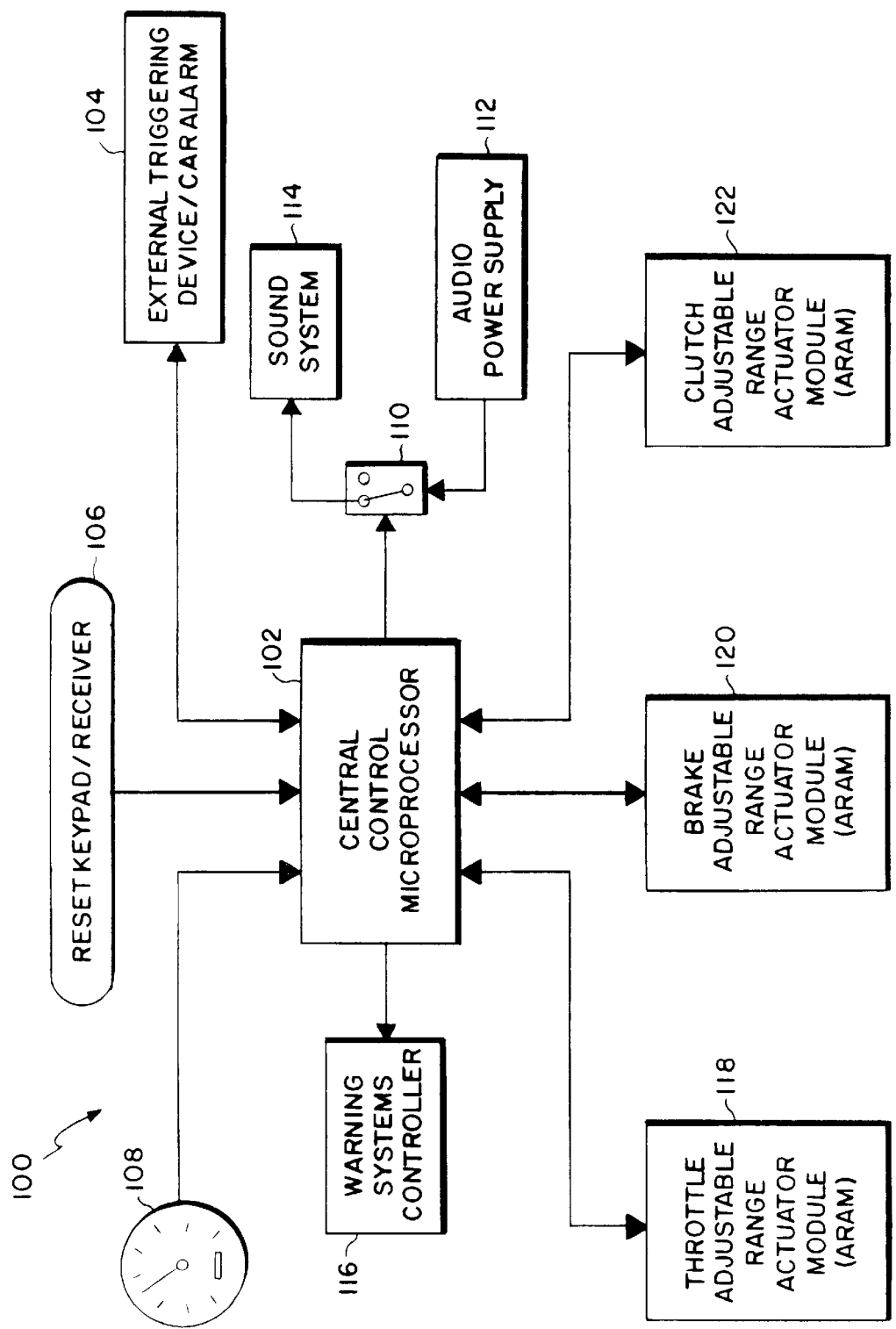
FIG. 1 is a block diagram of the automated system for immobilizing a vehicle of the present invention showing a central control microprocessor which serves to receive and analyze system parameters from a plurality of monitored devices.

The present invention is an automated system 100 for immobilizing a vehicle (not shown) arid method therefore as shown in FIG. 1. The present invention immobilizes a stationary vehicle and brings a moving vehicle to a gradual and safe stop without cutting power to the vehicle engine. The automated system 100 is typically employed in a motor vehicle (not shown) for disabling the throttle control system and for deploying the brake and clutch control systems, respectively, after a robbery of the vehicle, known as a carjacking, has occurred.

The automated system 100 shown in FIG. 1 includes a central control 102 for analyzing a plurality of monitored parameters and for controlling the operation of the automated system 100. The automated system 100 shown in FIG. 1 also includes an external triggering device 104 for generating a triggering signal, a reset keypad/receiver 106 used to manually reset the central control 102 and to intercept remotely transmitted control signals, a vehicle speedometer 108 for determining the speed of the vehicle, an audio control module 110 which serves as a switch between an audio power supply 112 and a vehicle sound system 114, and a warning systems controller 116 employed to issue sensory warnings to an unauthorized driver and surrounding vehicles. The automated system 100 of FIG. 1 also shows a throttle adjustable range actuator module 118 for disabling the vehicle accelerator, a brake adjustable range actuator module 120 for deploying the vehicle brakes to stop the vehicle and a clutch adjustable range actuator module 122 for deploying the clutch of the vehicle, if fitted, to prevent the transfer of power from the engine (not shown) to the wheels of the vehicle.

The central control 102 is the main control component of the automated system 100. Each subcomponent of the present invention communicates with the central control 102 as is shown in FIG. 1. Communication with the central control 102 manifests itself wherein commands are sent and/or data exchanged with other subcomponents of the automated system 100. As shown in FIG. 1, the subcomponents include the external triggering device 104, the reset keypad/transmitter 106, the speedometer 108, the audio control module 110, a plurality of sensory devices operated by the warning systems controller 116 and the throttle, brake and clutch actuator modules 118, 120 and 122, respectively.

Figure 2:
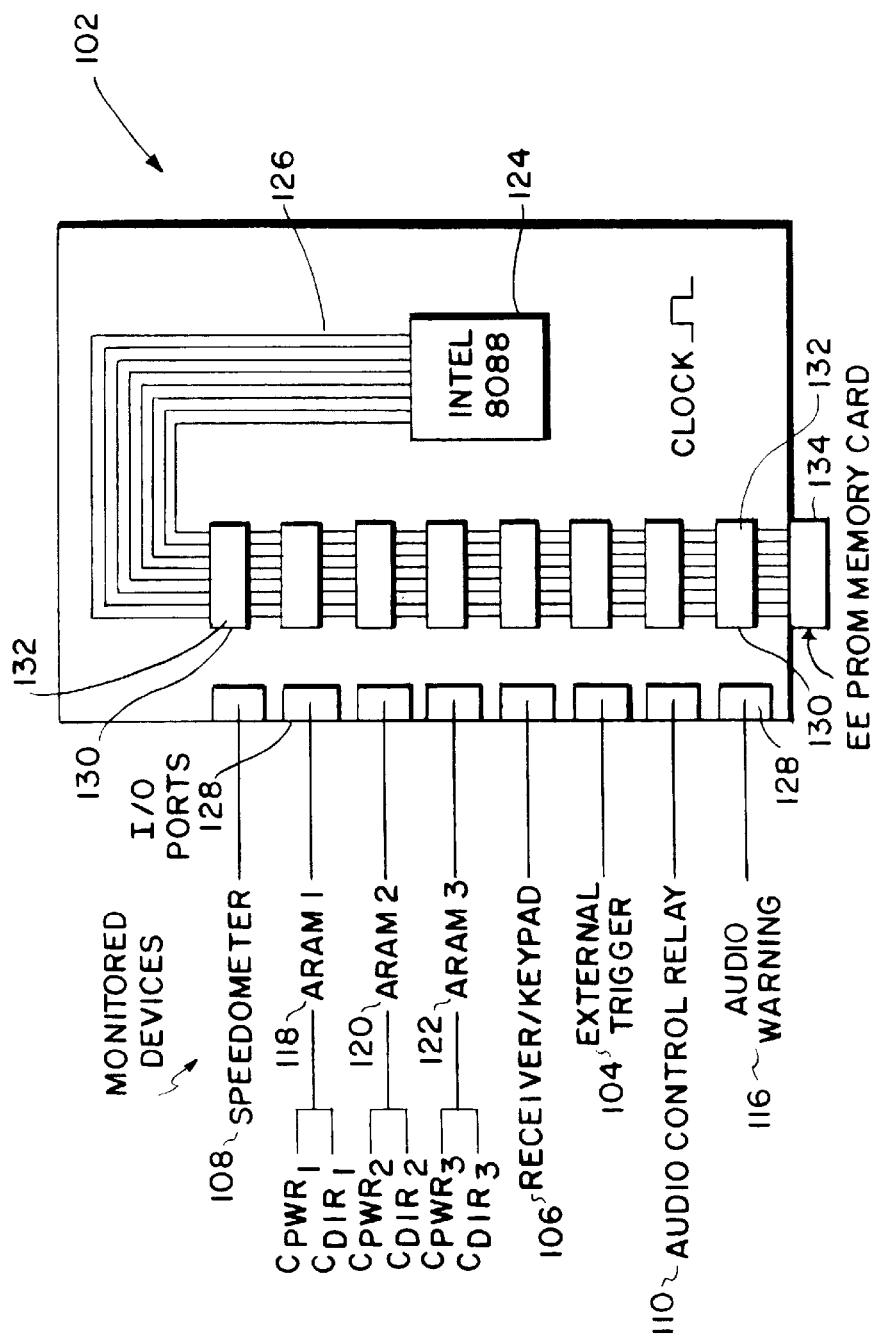
FIG. 2 is a block diagram of the central control microprocessor of the automated system for immobilizing a vehicle of FIG. 1 showing the connections of the monitored devices to the central control microprocessor.

An exemplary embodiment of the central control 102 is shown in FIG. 2. The central control 102 includes a microprocessor 124 which is the main computer board comprising an eight-bit architecture known in the art. An example construction of a suitable microprocessor 124 can be found in the Intel 8088 microprocessor known in the art. Associated with the microprocessor 124 is a crystal oscillator (not shown) operating at a frequency of, for example, one MegaHertz. The crystal oscillator serves to provide a clock pulse in the form of a square wave appearing on the central control 102 in FIG. 2. The clock pulse serves to coordinate each of the functions performed by the microprocessor 124. Connected to the microprocessor 124 is a plurality of eight data bus paths 126. The data bus paths 126 serve as parallel information pathways for the digital data transmitted from the plurality of monitored devices to the microprocessor 124. The data bus paths 126 are based upon a memory mapped input/output (I/O).

The central control 102 is fitted with a plurality of eight input/output (I/O) ports 128 with each of the I/O ports 128 corresponding to one of the plurality of monitored devices as shown in FIG. 2. The I/O ports 128 function as receiving points for digital data collected from the monitored devices which is to be analyzed by the microprocessor 124. The eight I/O ports 128 collect data from the speedometer 108, the throttle actuator module 118 (identified as ARAM 1 in FIG. 2), the brake actuator module 120 (identified as ARAM 2 in FIG. 2), the clutch actuator module 122 (identified as ARAM 3 in FIG. 2), the keypad/receiver 106, the external triggering device 104, the audio control relay 110 and the audio warning controller 116. The identification number for each of the monitored devices is shown on FIG. 2 to identify the source monitored and to provide consistency with the elements of the block diagram of FIG. 1.

Connected in series with the data bus paths 126 is a plurality of interface card slots 130 as shown in FIG. 2. The number of interface card slots 130 is equivalent to the number of I/O ports 128 and the number of data bus paths 126. Each interface card slot 130 contains a corresponding interface card 132. It is noted that the interface card design of the central control 102 is entirely modular. Typically, there is one interface card 132 for each device that the microprocessor 124 monitors and controls. Each interface card 132 serves to connect a particular monitored device to the microprocessor 124 via the corresponding I/O port 128 and data bus path 126. The signals detected from each of the monitored devices are analog in nature. Thus, the interface cards 132 function to convert the analog signals into signals that the microprocessor 124 can identify and process, e.g., into a digital format. Thus, an electrical connection is completed from the monitored devices shown in FIG. 2 to the corresponding I/O port 128, interface card slot 130, interface card 132, data bus path 126 and the microprocessor 124.

Figure 9:
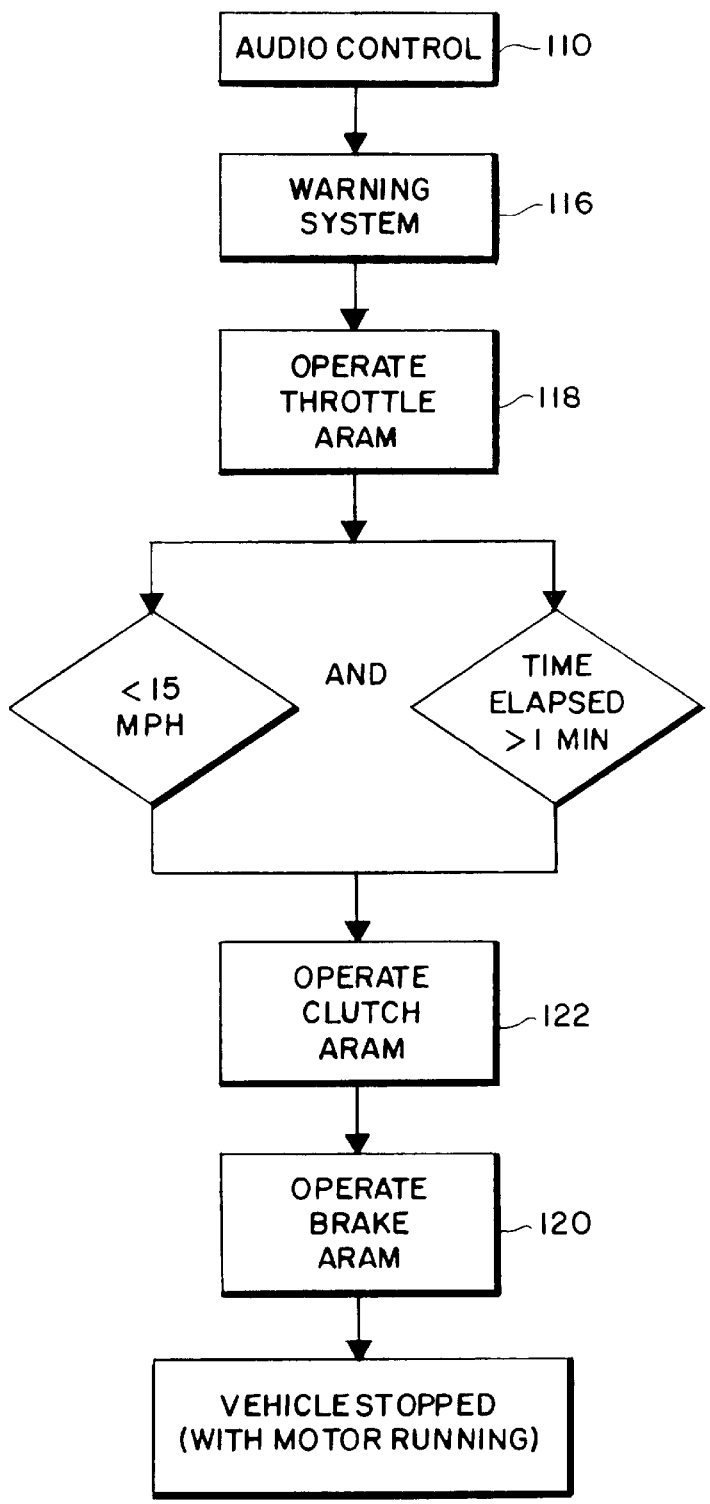
FIG. 9 is a flow chart of the sequence of instructions executed by the automated system for immobilizing a vehicle of FIG. 1 when the vehicle is moving.
Figure 10:
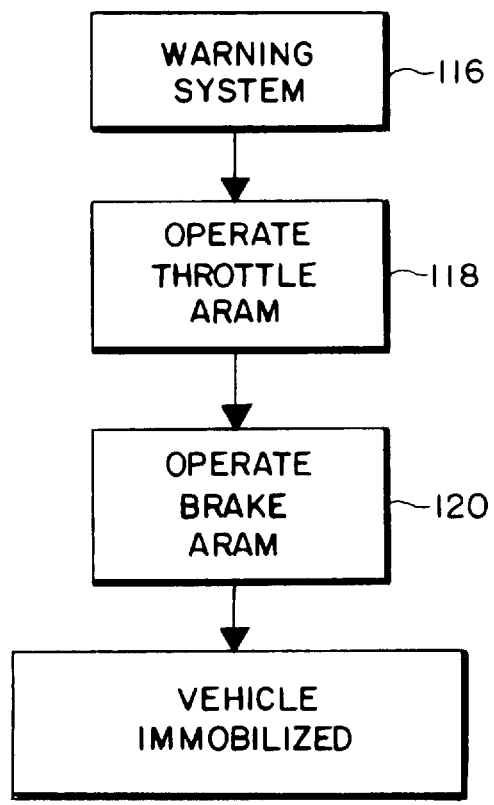
FIG. 10 is a flow chart of the sequence of instructions executed by the automated system for immobilizing a vehicle of FIG. 1 when the vehicle is not-moving.

The automated system 100 is capable of detecting if the vehicle in which it is installed is moving or not moving, e.g., stopped. This is accomplished by an electrical, erasable programmable read-only-memory (EEPROM) 134 associated with the microprocessor 124 and shown connected to the data bus paths 126 in FIG. 2. The read-only-memory 134 contains and operates a single computer program which comprises a plurality of subroutines. The instructions for a first of the subroutines is intended to be utilized for moving vehicles and the steps associated with the first subroutine are shown in FIG. 9. The instructions for a second of the subroutines is intended to be utilized for non-moving, e.g., stopped, vehicles and the steps associated with the second subroutine are shown in FIG. 10.

An example of a single computer program operated by read-only-memory 134 which comprises at least two different subroutines suitable for use in the present invention will now be described. The computer program comprises an algorithm that is disclosed in its entirety in FIG. 9 (discussed in detail hereinafter). The algorithm discloses a sequence of instructions that are executed "in-whole" when the vehicle is moving (see FIG. 9) or executed "in-part" when the vehicle is not moving, e.g., parked (see FIG. 10). The algorithm includes a main loop, a plurality of four checks or inquiries and at least a pair of subroutines. The main loop of the computer program stored in and executed by the read-only memory 134 is well known in the art. All software programs written and designed for use with a digital computer include a main loop. For example, the ANSI "C" programming language (which is a standard known in the art) includes a program section identified as "Main". The "Main" section of the ANSI "C" programming language is that section in which the execution of the program begins. Thus, the technique for constructing the main loop of the computer program algorithm is well known in the art.

In the present invention, the main loop of the algorithm executed by the read-only-memory 134 functions to (a) scan for commands transmitted to the microprocessor 102 and (b) assign the correct subroutine to execute the commands received by the microprocessor 102. It is noted that a command can be any instruction from an external source or the automated system 100 to, for example, arm the automated system 100, disarm the automated system 100, modify the computer program executed by the read-only-memory 134, change the parameters of the algorithm, and the like. The main loop also serves to authenticate the security code of received commands. Further, the main loop includes a minimum of two branching points, each directed to one of the two subroutines, so that the received commands can be directed to the correct subroutine.

Next, the main loop of the algorithm executes the four checks or inquiries to determine which of the subroutines included within the computer program will be selected. The first subroutine is directed to a moving vehicle as shown in FIG. 9 and the second subroutine is directed to a non-moving vehicle as shown in FIG. 10. Thus, the function of the four inquires is to transmit the received instruction from the main loop to the correct subroutine. The first query or check conducted by the algorithm inquires whether a command has been issued to the central control 102 from any monitored device shown in FIG. 2. It is noted that a command can be triggered by any of the monitored devices shown in FIG. 2. If a command does not exist, the main loop continues scanning for issued commands. However, if a command has been issued, it is recorded in memory for processing by subsequent inquiries or checks. The main loop then proceeds to the second query or check.

The central control 102 of the automated system 100 is capable of receiving triggering commands from the plurality of monitored devices as shown in FIG. 2. Some commands are received from the external triggering device 104. All commands received by central control 102 from a remote source must include a security code for authentication purposes. Thus, the second query or check inquiries whether the security code assigned to the command (identified and recorded in the first query or check) is valid. This is accomplished by matching the security code assigned to the received command to the security code stored on the read-only-memory 134 as shown in FIG. 2. If the security code assigned to the received command does not match the stored security code, e.g., invalid, the main loop continues to scan for commands as in the first inquiry or check. However, if the security code assigned to the received command does match the stored security code, e.g., valid, the main loop proceeds to the third query or check.

The third query or check conducted by the algorithm is intended to determine which command was issued to the central control 102 from the monitored devices shown in FIG. 2. If the command is not recognized, the main loop returns to the first inquiry or check and continues to scan for commands. However, if the command is recognized, the algorithm branches to one of the two branching points to transmit the command to the appropriate subroutine for execution. Thereafter, the main loop will continue to scan for commands. If the received command is to "arm" the automated system 100, then the main loop proceeds with the fourth query or check.

The fourth query or check is to determine whether the vehicle is moving or stopped. Selection of the first or second program subroutine for the mode of operation that exists is made possible by the detection and monitoring of the output signal of the speedometer 108. If the speedometer 108 registers a velocity or an acceleration (e.g., movement) of the wheels, the computer program branches to the first subroutine and begins executing the instructions of the algorithm shown in FIG. 9. If the speedometer 108 does not indicate movement of the vehicle, the computer program branches to the second subroutine and begins executing the instructions shown in FIG. 10 (which is a portion of the algorithm shown in FIG. 9). Thus, the microprocessor 124 causes the appropriate program subroutine to be enabled. Thereafter, the proper instructions for activating the appropriate programmed response can be selected and initiated by the microprocessor 124.

In effect, a determination is made as to which flow diagram, either FIG. 9 (vehicle moving) or FIG. 10 (vehicle parked), applies. Operation of the vehicle engine is not relevant in determining if the vehicle is moving since the automated system 100 is capable of immobilizing the vehicle with the engine running. Thus, the program stored in the read-only-memory 134 provides the microprocessor 124 with the capability of identifying the two modes of operation, e.g., vehicle moving or non-moving. The final step of the algorithm of the computer program is the execution of the proper subroutine. The first subroutine for a moving vehicle and the second subroutine for a non-moving vehicle will be described hereinafter in accordance with FIGS. 9 and 10 beginning on page 40, respectively, after the structure of present invention has been discussed in more detail.

If the speedometer 108 indicates that the vehicle (in which the automated system 100 is installed) is moving, specific parameters are utilized to determine when deployment of the braking and clutching features of the automated system 100 will activate. Those parameters include the speed below which the automated system 100 will actuate and the lag time provided by the automated system 100 to the unauthorized driver to remove the stolen vehicle from the roadway. These two features are selected to maximize the safe operation of the automated system 100. The microprocessor 124 is programmed to default to a system activation speed of less than fifteen miles-per-hour and a lag time of at least one minute. These default parameters are clearly shown on the flow diagram associated with a moving vehicle shown in FIG. 9. Thus, after the vehicle throttle is disabled, the vehicle must slow to a speed of less than fifteen miles-per-hour and a time period of at least one minute must pass before the vehicle brake and clutch are deployed. This provides time to the unauthorized driver to steer the stolen vehicle to the side of the roadway prior to the vehicle brakes being automatically applied. These default parameters are variable and can be modified over a communication link such as a pager frequency, satellite digital link, optical communication medium or the like in combination with the reset keypad/receiver 106.

The external triggering device 104 can be embodied in any one of a plurality of suitable mechanisms. Notwithstanding the nature of the mechanism, the external triggering device 104 functions to provide an indication of an abnormal condition in the vehicle. The external triggering device 104 indicates an abnormal condition by generating a triggering signal which is received at the appropriate I/O port 128 of the central control 102 as shown in FIG. 2. Thus, the triggering signal is transmitted from the external triggering device 104 to the microprocessor 124 via the corresponding interface card 132 and data bus path 126. Under these conditions, the triggering signal is monitored and analyzed by the microprocessor 124. Likewise, the same path is utilized to transmit command signals from the microprocessor 124 to the throttle actuator module 118 to disable the vehicle accelerator, and to the brake actuator module 120 and the clutch actuator module 122 to deploy the vehicle brakes and clutch, respectively.

The type of external triggering device 104 utilized in the automated system 100 is dependent upon whether the vehicle is moving or non-moving. This is the case since the nature of the external triggering device 104 may change when the movement status of the vehicle changes. For example, when the vehicle is not moving, the external triggering device 104 can be any one of several suitable vehicle alarms including a motion detector or a vehicle door activity monitoring device such as a spring-loaded switch. Other more exotic devices can include an alarm apparatus intended to monitor the fitness of the driver such as a sobriety device. In these examples, the non-moving vehicle is typically parked (as opposed to being stopped with the engine idling) since the example external triggering devices 104 will operate properly only if the vehicle is stopped.

If the stolen vehicle is moving, other means of external triggering are useful. Therefore, if the vehicle has been stolen and is being driven along a roadway, an external triggering device 104 located remote from the vehicle fitted with the automated system 100 can be used to transmit the triggering signal. External triggering devices 104 which can be designed to transmit a triggering signal from a remote location to the central control 102 of a moving vehicle include a remote transmitter such as a radio frequency (RF) link, a mobile telephone frequency link or any mobile electromagnetic data transmission network. The external triggering device 104 shown connected for two-way communication with the central control 102 in FIG. 1 is designated as a car alarm for illustration purposes only.

The combination reset keypad/receiver 106 is utilized to reset the microprocessor 124 when the automated system 100 is deactivated. Thus, a communication link is established from the reset keypad/receiver 106 to the central control 102. The resetting of the microprocessor 124 can be completed manually or remotely. Manual resetting of the microprocessor 124 can be accomplished with the keypad portion of the combined keypad/receiver 106. The keypad portion can be similar to a standard alpha-numeric dialing keypad of a telephone. The manual keypad can be mounted to the vehicle dashboard or to the exterior surface of the vehicle door to enable the automated system 100 to be reset. Remote resetting of the microprocessor 124 can be accomplished by the receiver portion of the combined keypad/receiver 106. Communication with the receiver portion of the combined keypad/receiver 106 can be accomplished with the use of a short range pocket transmitter (not shown). The communication link between the receiver portion and the short range pocket transmitter (not shown) can be accomplished by (a) a cellular link connected to the receiver slot in the central control 102 and transmitted via electromagnetic frequencies, or (b) a paging link which monitors a single paging frequency with a specific code or device number via an RF link.

Notwithstanding the use of manual or remote resetting of the microprocessor 124, the resetting procedure remains the same. Specifically, a preset security code is placed into memory within the microprocessor 124 of the central control 102. In order to reset the automated system 100, a security code must be entered into the microprocessor 124 that matches the preset code stored in memory within the microprocessor 124. If the entered security code matches the preset code stored within the microprocessor 124, the automated system 100 is reset. The entering of the security code can be accomplished by operating the appropriate number keys on the keypad portion or by transmitting the security code via electromagnetic frequencies that are readable by the receiver portion of the reset keypad/receiver 106 of the automated system 100. If the automated system 100 is successfully reset, the warning systems controller 116 is muted, the vehicle sound system 114 is reenabled and the throttle, brake and clutch actuator modules 118, 120,122, respectively, are reset to their neutral positions.

In the present invention, the determination of whether the vehicle is moving or parked determines which subroutine of the program encoded within the read-only-memory 134 will be selected. For example, if the stolen vehicle is moving, the subroutine having the steps reflected in FIG. 9 for a moving vehicle will be selected and executed. In the alternative, if the vehicle is parked, the subroutine having the steps reflected in FIG. 10 for a parked vehicle will be selected and executed. Thus, knowing whether the stolen vehicle is moving or parked determines which steps in the process will be activated and in what order the steps will be executed. The information to determine whether the stolen vehicle is moving or parked is provided by the speedometer 108. A communication link is established from the speedometer 108 to the central control 102 as shown in FIG. 1. Movement of the stolen vehicle will be registered on the speedometer 108 and an appropriate signal will be generated and transmitted to the central control 102 as is shown in FIG. 2. Likewise, non-movement of the stolen vehicle will not generate a measurable signal and thus the absence of a signal from the speedometer 108 will indicate to central control 102 that the vehicle is not moving.

Typically, the stolen vehicle includes a radio or stereo entertainment system which is represented by the sound system 114 in FIG. 1. The sound system 114 is energized by the audio power supply 112 which is provided by the regulated electrical power source within the vehicle. The audio control module 110 is positioned between the audio power supply 112 and the vehicle sound system 114 as shown in FIG. 1. The audio control module 110 is a single-position, dual-terminal relay which is available from an electronic supplier such as, for example, Radio Shack. After the automated system 100 is activated, the vehicle sound system 114 must be muted so that audible warnings issued by the warning systems controller 116 can be heard by the unauthorized driver. This is accomplished by disconnecting the vehicle sound system 114 from the audio power supply 112 with the audio control module 110.

A communication link is established from the central control 102 to the audio control module 110 as is shown in FIG. 1. The audio control module 11 0 controls the connection between the vehicle sound system 114 and the audio power supply 112. The position of the audio control module 110 is determined by a command from the microprocessor 124. Further, the position of the audio control module 110 changes in accordance with the command from the microprocessor 124 whether the vehicle sound system 114 is energized or not.

In accordance with FIG. 1, if the audio control module 110 is in a first position, the vehicle sound system 114 is energized by the audio power supply 112. This first position of the audio control module 110 is the normal operating state assumed when the automated system 100 is not activated. In the alternative, if the audio control module 110 is in a second position, the vehicle sound system 114 is disconnected from the audio power supply 112. This second position of the audio control module 110 is the disconnected state assumed when the automated system 100 is activated.

The arrangement described in the preceding paragraphs and shown in FIG. 1 for controlling the operation of the vehicle sound system 114 during operation of the automated system 100 is preferred. However, other suitable design schemes are available to provide the same result. One alternative method involves blocking, e.g., preventing, the audio signal generated by the sound system 114 from reaching the output speakers (not shown). Under these conditions, the vehicle sound system 114 is muted by preventing operation of the output speakers (not shown) instead of interrupting the electrical power to the sound system 114. Another less desirable alternative method involves blocking, e.g., preventing, the low level pre-amplifier signal from reaching the amplifiers (not shown) of the vehicle sound system 112. This method effectively prevents the processing of the detected signal.

After the automated system 100 has been activated and the vehicle sound system 114 has been muted, it is desirable to issue a plurality of audio and sensory warnings to the unauthorized driver of the stolen vehicle and to surrounding vehicles. The audio and sensory warnings are intended to notify the unauthorized driver that he is about to lose control of a plurality of vital features necessary to drive the vehicle. The warnings are also intended to notify drivers of other vehicles on the roadway of the problems associated with the stolen vehicle. The warning systems controller 116 is employed to accomplish this task prior to the disabling and deploying of vital control devices necessary to drive the stolen vehicle.

Instructions, e.g., an activate signal, to issue the plurality of audio and sensory warnings are transmitted across a communication link established from the central control 102 to the warning systems controller 116 as shown in FIG. 1. It is noted that these steps are clearly set forth in the flow diagram for moving vehicles shown in FIG. 9. Further, the issuing of the audio and sensory warnings are shown as the initial step in the procedure associated with a parked vehicle shown in FIG. 10. Likewise, the microprocessor 124 issues instructions, e.g., a reset signal, to the warning systems controller 116 across the established communication link to discontinue the broadcast of the audio and sensory warnings at the appropriate time.

The warning systems controller 116 comprises hardware preferably mounted within the driver compartment of the stolen vehicle and can comprise a voice recordable chip or erasable programmable read-only-memory for storing the audio messages thereon. The warning systems controller 116 can also include a miniature amplifier and speaker arranged to enable the broadcast of the audio warnings. These and other known components necessary to assemble the warning systems controller 116 can be obtained from an electronics supply center such as, for example, Radio Shack. Thus, the self-contained miniature amplifier and speaker eliminates the need to utilize hardware components of the vehicle sound system 114 to broadcast the audio warnings.

It is noted that all audio and visual sensory warnings originate from the warning systems controller 116 which also includes an output relay (not shown). The output relay (not shown) is designed to actuate other components and systems upon receiving a signal from the automated system 100. Specifically, any of the audio and visual sensory warnings can be triggered by a voltage signal transmitted to the warning systems controller 116 from the central control 102. The voltage signal can instruct the warning systems controller 116 to activate specific parameters which, in turn, can cause the activation of other parameters via the output relay (not shown).

Examples of audio warnings that can be controlled by the warning systems controller 116 include activating (a) the car alarm system including a noise generating device, (b) the car horn sounding at short frequent blasts, and (c) a built-in public address system to announce verbal warnings to other vehicles on the roadway. Examples of sensory visual warnings include (d) the flashing of the vehicle emergency blinkers and headlamps, (e) the rapid oscillation of the vehicle tail light flashers in a distinguishable pattern, (f) a heads-up display comprising a large message flashing on the windshield, and (g) a pair of flashing yellow lights (not shown) mounted behind the rear seat and in the rear window of the vehicle including an on-switch operated by the output relay (not shown). It is noted that the triggering of the car alarm, e.g., the external triggering device 104, can control the operation of other vehicle auxiliaries including the vehicle headlamps, tail light flashers, horns and the like. After the issuance of the audio and sensory visual warnings, the microprocessor 124 issues a reset signal to the warning systems controller 116 to discontinue the display of audio and sensory visual warnings.

After the audio and sensory visual warnings have been activated and after the intervening speed and time requirements (e.g., <15 mph and time elapsed>1 min.) have been satisfied, the microprocessor 124 issues instructions to the throttle actuator module 118 to disable the vehicle accelerator. These instructions are transmitted across a communication link established between the throttle actuator module 118 and the central control 102 as shown in FIG. 1. It is noted that data travels in both directions on the communication link between the throttle actuator module 118 and the central control 102 for the purpose of monitoring the status of the throttle actuator module 118 and sending commands. In general, the vehicle accelerator is disabled by placing slack in an accelerator cable 140 as will now be described with reference to FIGS. 3A–C.

In a typical motor vehicle which is not fitted with the automated system 100, an accelerator pedal 142 is mounted to the floor inside the vehicle. The accelerator pedal 142, in turn, is connected to articulated linkage (not shown) for moving the accelerator cable 140 through various fulcrums and connection points as is known in the art. The accelerator cable 140 is then circuited through a first cable sheath 144 and firmly attached to a throttle arm 146 of the fuel feed mechanism (not shown) such as a carburetor or fuel injection device. Movement of the accelerator cable 140 caused by applying pressure to and releasing pressure from the accelerator pedal 142 causes movement in the throttle arm 146 resulting in the delivery of fuel to the vehicle engine via the fuel feed mechanism.

The throttle actuator module 118 and the corresponding accelerator cable 140 of the present invention shown in FIGS. 3A–C replaces the factory installed throttle cable (not shown). The throttle actuator module 118 is enclosed within a throttle actuator housing 148. The first accelerator cable sheath 144 includes first and second cable sleeve fittings 150, 152 with one on each end thereof for securing the first cable sheath 144 to a fuel feed mechanism housing (not shown) and to the throttle actuator housing 148. The second cable sleeve fitting 152 is anchored and secured to the top of the throttle actuator housing 148 through which the accelerator cable 140 enters. The accelerator cable 140 enters the throttle actuator housing 148 and immediately is wrapped underneath a fixed pulley 154. The fixed pulley 154 is fixed in position and rotates about a pulley axis 156 as shown in FIGS. 3A and 3B.

Mounted to the left of the fixed pulley 154 (as shown in FIGS. 3A and 3B) is a movable pulley 158 which is mounted upon a movable axis 160 as shown in FIGS. 3A–C. Connected to the movable axis 160 and to the inside top of the throttle actuator housing 148 is a pair of pulley return springs 162 for the movable pulley 158. The return springs 162 functions to hold the movable pulley 158 in position and the spring constant associated therewith is designated "$K_2$". The return springs 162 of the movable pulley 158 are more clearly shown in FIG. 3C.

It is noted that the throttle arm 146 shown in FIGS. 3A–3B includes a fixed lever arm 164 attached thereto which is connected to a fixed point 166 via a throttle arm spring 168. The spring constant associated with the throttle arm spring 168 is designated as "$K_1$". When the accelerator pedal 142 is pushed, a corresponding pulling force is applied to the accelerator cable 140 as shown in FIG. 3A. Under normal conditions, the pulling force on the accelerator cable 140 causes the throttle arm 146 to rotate counterclockwise on its axis from the normal position while operating the fuel feed mechanism (not shown). When the pulling force on the accelerator cable 140 is removed, the throttle arm spring 168 forces the throttle arm 146 to rotate on its axis back to the normal position. It is noted that the throttle arm spring 168 is much stronger than the pair of pulley return springs 162 and that the spring constant "$K_1$" of the throttle arm spring 168 is related to the spring constant "$K_2$" of the pair of pulley return springs 162 in the following manner $$K_1 > 5K_2 \tag{1}$$

As shown in FIGS. 3A and 3B, the accelerator cable 140 passes underneath the fixed pulley 154 and over the top of the movable pulley 158. The accelerator cable 140 is then routed out the bottom of the throttle actuator housing 148 via a penetration (not shown). The accelerator cable 140 is then routed through a third cable sleeve fitting 170 affixed to the bottom of the throttle actuator housing 148, a second accelerator cable sheath 172 for protection, and a fourth cable sleeve fitting 174. The accelerator cable 140 is then combined with an accelerator fixed lever 176 at a connection point 178. The accelerator fixed lever 176 is attached to the accelerator pedal 142 and rotates about a fulcrum point 180 when the accelerator pedal 142 is operated as shown in FIGS. 3A and 3B.

The movable axis 160 is clearly shown passing through the movable pulley 158 in FIG. 3C. Each end of the movable axis 160 includes a flange 182 that rides within a vertical sliding rail or race 184. This construction enables the movable pulley 158 to move in a vertical translational manner along the sliding rail 184 when force is applied to the movable pulley 158 such as by the pair of pulley return springs 162. The pulley return springs 162 are connected to the movable axis 160 just inboard of the sliding rail 184 as is clearly shown in FIG. 3C. A U-shaped metallic bracket 186 is shown mounted directly beneath the movable pulley 158 in FIGS. 3A and 3B. The metallic bracket 186 includes a pair of penetrations with one penetration formed in each upward extending section of the U-shaped bracket 186. The penetrations are aligned so that the movable axis 160 passes therethrough and the U-shaped bracket 186 hangs from the movable axis 160 and extends below to movable pulley 158.

Extending laterally from the bottom of the U-shaped metallic bracket 186 is a pair of bottom guides 188 which also ride in the sliding rail 184 as shown in FIG. 3C. The bottom guides 188 serve to prevent misalignment during movement of the movable pulley 158 along the sliding rail 184 within the throttle actuator module 118. Also shown in FIG. 3C is the accelerator cable 140 entering the throttle actuator housing 148 via the second cable sleeve fitting 152, passing under the fixed pulley 154 and exiting via the third cable sleeve fitting 170.

Mounted directly beneath and attached to the throttle actuator housing 148 is an electrical solenoid 190 or equivalent motorized actuator. Mounted within the solenoid 190 is a moveable piston 192. The location of the piston 192 is controlled by the energized state of the solenoid 190. Thus, when the solenoid 190 is energized, the piston 192 is extended out of the solenoid 190 as shown in FIG. 3A. Under these conditions, the piston 192 butts against the U-shaped bracket 186 and holds the movable pulley 158 in a position that maintains tension in the accelerator cable 140 and the pulley return springs 162 are compressed. However, when the solenoid 190 is de-energized, the piston 192 is retracted into the solenoid 190 as shown in FIGS. 3B and 3C. Because of these conditions, the movable pulley 158 and the U--shaped bracket 186 are permitted to move in a downward direction within the sliding rail 184. Under these conditions, the accelerator cable 140 becomes slack, e.g., lacks tension, and the pulley return springs 162 are extended in an effort to pull the movable pulley 158 upward.

Under normal operating conditions, the throttle actuator module 118 is not activated, e.g., not deployed. The electrical solenoid 190 is energized and the movable piston 192 is fully extended into the locked position providing rigid support to the U-shaped bracket 186 and the movable pulley 158. Thus, when the accelerator pedal 142 is pushed, the accelerator cable 140 moves through the first and second accelerator cable sheaths 144 and 172, respectively. This permits the throttle arm 146 to be operated so that fuel is delivered to the engine of the vehicle to sustain acceleration beyond idle.

When the throttle actuator module 118 is actuated, e.g., deployed, the electrical solenoid 190 is de-energized and the movable piston 190 is retracted. The movable pulley 158 is now free to move from the preferred position when the accelerator pedal 142 is pushed. The pulley return springs 162 assist in returning the movable pulley 158 to the preferred position once the accelerator pedal 142 has been pushed. This enables the accelerator cable 140 to remain under tension around both the movable pulley 158 and the fixed pulley 154 at all times as shown in FIG. 3A. The movable axis 160 of the movable pulley 158 is guided in a translational direction within the sliding rail 184 by the flanges 182 and the bottom guides 188. When the accelerator pedal 142 is pushed, the movable pulley 158 is displaced downward along the sliding rail 184 by the weight of the accelerator cable 140. Since the pulley return springs 162 are much weaker than the throttle arm spring 168, the movable pulley 158 is not returned to the preferred position. Consequently, slack forms in the accelerator cable 140 as shown in FIG. 3B and pushing on the accelerator pedal 142 does not move the accelerator cable 140 through the first and second accelerator cable sheaths 144 and 172, respectively. The throttle arm 146 is not operated and the fuel delivered to the engine is sufficient only to sustain an idle. As a result, the throttle is essentially disabled.

After the throttle actuator module 118 has been activated, the throttle, e.g., the accelerator pedal 142, is disabled so that the vehicle cannot be driven. This is the case even though the vehicle engine continues to idle. Thus, the automated system 100 does not directly disable the vehicle engine as do other known vehicle security systems. With the throttle disabled, the stolen vehicle moving along a roadway begins to slow down as though the driven had removed his foot from the accelerator pedal 142.

The next step in the operational phase of the automated system 100 is to deploy the vehicle clutch (if fitted) and the brakes to stop the stolen vehicle and frustrate the theft. Because of issues relating to traffic safety, certain safeguard parameters are built into the automated system 100 of the present invention. In accordance with the first subroutine of the program recorded on the read-only-memory 134 (see FIG. 2), the vehicle speed must be less than a variable value read from the read-only-memory (EEPROM) 134, such as a default threshold speed of fifteen miles-per-hour and a time elapsed before the clutch and brakes are automatically deployed, such as a time threshold of sixty seconds. These parameters are shown clearly on the flow diagram for moving vehicles shown in FIG. 9. Thus, the input signal from the speedometer 108 to the central control 102 which indicates the speed of the vehicle and the contents of the first subroutine and the system clock are employed to satisfy these safeguard parameters.

The brake actuator module 120 and the clutch actuator module 122 each shown on FIG. 1 are duplicate in their construction and operation. This is the case since each actuator module 120 and 122, respectively, is designed to pull a foot pedal, either the brake pedal or the clutch pedal, far enough to the vehicle floor to either securely apply the brakes or disengage the clutch. For this reason, only one of the two actuator modules 120 and 122, respectively, will be described in detail in FIGS. 4–7. In the following discussion, the brake actuator module 120 was selected for description since all motor vehicles are required to have brakes. However, not all motor vehicles are fitted with a manual clutch pedal and thus the clutch actuator module 122 would not be required.

The operation of the brake actuator module 120 and the clutch actuator module 122 occurs almost simultaneously. These two steps appearing in the flow diagrams shown in both FIGS. 9 and 10 could be reversed and the automated system 100 would operate successfully. The microprocessor 124 issues instructions to the brake actuator module 120 and the clutch actuator module 122 to deploy the vehicle brakes and the manual clutch, if fitted. These instructions are transmitted across a communication link established between (a) the brake actuator module 120 and the central control 102 and (b) the clutch actuator module 122 and the central control 102 both shown in FIG. 1. It is noted that data travels in both directions on each of these communication links as is indicated by the double arrowhead on each of these lines shown in FIG. 1.

In general, the vehicle brakes and/or manual clutch are deployed by securely attaching a separate wire cable 200 between (a) the motorized brake actuator module 120 and the brake pedal 202 and (b) the motorized clutch actuator module 122 and a clutch pedal. In this embodiment, the brake pedal 202 shall also include the equivalent of the clutch pedal since their operating mechanisms are equivalent. Upon receipt of a triggering signal, the microprocessor 124 energizes a motor 204 which via a set of drive gears turns a power screw 206 which drives a threaded sliding bolt 208. The sliding bolt 208 can be driven in either direction along the power screw 206. Further, the wire cable 200 is connected between the sliding bolt 208 and the brake and/or clutch pedal 202. When deployed, the sliding bolt 208 is driven in a direction that creates tension in the wire cable 200 so that the brake and/or clutch pedal 202 is pulled to the floor board of the vehicle. This structure will now be described with reference to FIGS. 4–7.

The motor 204 is shown mounted within a brake actuator housing 205. The motor 204 serves to drive the power screw 206 through a gear train to provide linear motion to the threaded sliding bolt 208 as is shown in FIGS. 4 and 5. By providing linear motion to the sliding bolt 208, the motor 204 also functions to control the travel of the brake (and clutch) pedal 202 which is indirectly connected to the sliding bolt 208 via an inner brake plate 210 and the wire cable 200. The motor 204 is a fractional horsepower (e.g., less than 1 HP) universal type motor rated at 24 VDC and 5000 RPM at half-voltage. A universal type motor is employed in this invention since the rotation of the armature reverses upon reversing the polarity of the supply voltage. The motor 204 must be reversible since the sliding bolt 208 must be driven in both directions along the power screw 206.

The motor 204 causes rotation of the power screw 206 through the gear train as is shown in FIGS. 4 and 5. A motor shaft 212 is shown passing adjacent a rear structural member 214 and anchoring in a stability gear plate 216 in FIG. 4. The gear train comprises a motor gear 218 mounted upon the motor shaft 212. The motor gear 218 is driven directly by the motor 204 and engages a first intermediate gear 220 mounted upon a support shaft 222 and anchored on the stability gear plate 216. The support shaft 222 and a second intermediate gear 224 rotate with the first intermediate gear 220. The second intermediate gear 224 engages and rotates a drive gear 226 which is mounted upon a central shaft 228.

The central shaft 228 is also anchored to the stability gear plate 216 as shown in FIGS. 4 and 5. The central shaft 228 rotates with the drive gear 226 and is connected to and directly drives the power screw 206. The power screw 206 includes a plurality of threads 230 which cooperate with the threaded sliding bolt 208 so that the sliding bolt 208 will translate along the power screw 206. The direction of movement of the sliding bolt 208 depends upon the direction of movement of the power screw 206 and the rotation of the motor 204. The gear ratio between the power screw 206 and the sliding bolt 208 is such that it creates a force sufficient to prevent the unauthorized driver from pulling the brake (and clutch) pedal 202 back into the non-deployed position. As a result, the brake actuator module 120 removes control of the brake (and clutch) pedal 202 from the unauthorized driver.

The sliding bolt 208 includes a pair of parallel arms 232 which pass through a corresponding pair of linear bearings 234 shown best in FIG. 4. The linear bearings 234 serve to (a) function as a guide to the pair of parallel arms 232, and (b) reduce the friction of the pair of parallel arms 232 of the sliding bolt 208 passing through a forward structural member 236. The linear bearings 234 which are known in the art are mounted to the forward structural member 236. The parallel arms 232 of the sliding bolt 208 pass through an outer brake plate 238 and the inner brake plate 210 as shown in FIGS. 4 and 5. A pair of spring sockets 242 is formed between the outer brake plate 238 and the inner brake plate 210 with each spring socket 242 housing a compression spring 244 as is shown in the partial cutaway view in both FIGS. 4 and 5. The pair of compression springs 244 each apply a pressure to keep the outer brake plate 238 and the inner brake plate 210 separated.

The outer brake plate 238 and the inner brake plate 210 are held together by (a) the wire cable 200 and an anchor point 246 which is held under tension by a brake pedal return spring 248 associated with the brake pedal 202 shown in FIG. 5, and (b) a pair of cable tension springs 250 connected between the inner brake plate 210 and the forward structure member 236. The cable tension springs 250 cause the inner brake plate 210 to apply a pressure against the anchor point 246 to maintain a tension on the wire cable 200 connected to the brake pedal 202. The brake pedal return spring 248 is a compression spring positioned to return the brake pedal 202 to the non-depressed position when foot pressure applied to the brake pedal 202 is released. The brake pedal return spring 248 is a robust spring having a spring constant designated as "$K_3$" while the pair of cable tension springs 250 each have a spring constant designed as "$K_4$". The relationship between these two spring constants is as follows $$K_3 > 2K_4 \qquad [2]$$

Thus, the spring constant "$K_3$" of the pair of cable tension springs 250 is less than the spring constant "$K_4$" of the brake pedal return spring 248. Thus, when the brake pedal 202 is released, it will return to the non-depressed, e.g., non-deployed position.

Each of the parallel arms 232 of the sliding bolt 208 terminate with a blunt end 252 as is shown in FIGS. 4 and 5. In the non-deployed, e.g., normal extended, position of the brake actuator module 120, the blunt ends 252 of the parallel arms 232 prevent the sliding bolt 208 from over-extending which could result in the sliding bolt 208 threading itself off of the power screw 206. In the deployed, e.g., non-extended, position of the brake actuator module 120, the blunt ends 252 function to grasp the inner brake plate 210 and pull it along as the sliding bolt 208 is threaded backwards toward the drive gear 226 of the gear train. Also shown in FIGS. 4 and 5 is a first cable sleeve 254 that guides and reduces friction on the wire cable 200. This component enables the brake and/or clutch actuator modules 120 and 122 to be mounted anywhere in the vehicle. For example, the wire cable 200 can be circuited to the forward section of the vehicle from the trunk without occupying much space or generating friction.

In the interest of safety, a number of features are incorporated into the present invention to de-energize the motor 204. The features are realized in the form of momentary type switches that are circuited in a manner to disconnect electrical power to the motor 204. Typically, momentary type switches are low voltage, spring-operated switches that are designed to have a normal state, e.g., normally-open or normally-closed. The state of the switch changes only for the time that a force is applied to the switch actuator. Once the force is removed, the switch actuator returns to the normal state.

In a situation where the brake (or clutch) actuator module 120 operates, the brake pedal 202 eventually becomes fully deployed, e.g., fully depressed. Under these conditions the brake pedal 202 is positioned closest to the vehicle floor board with hydraulic pressure applied to the brake shoes. The hydraulic brake system (not shown) prevents the brake pedal 202 from being depressed all the way to the floor board. The wire cable 200 is drawn tight between the brake actuator module 120 and the brake pedal 202. Eventually, the brake pedal 202 ceases movement but the motor 204 continues to rotate turning the power screw 206 and pulling the sliding bolt 208 to the deployed position, e.g., toward the gear train.

Simultaneously, the blunt ends 252 on the parallel arms 232 of the sliding bolt 208 pull the inner brake plate 210 toward the gear train (e.g., to the left as seen in FIGS. 4 and 5). The fully depressed (and stopped) brake pedal 202 causes tension in the wire cable 200 so that the outer brake plate 238 is pulled to the right as seen on FIGS. 4 and 5. When the force of the blunt ends 252 on the inner brake plate 210 combined with the force of the wire cable 200 on the outer brake plate 238 overcomes the resistance of the pair of compression springs 244 fitted within the spring slots 242, the inner brake plate 210 closes upon the outer brake plate 238. This condition could result in damage to the automated system 100 and to the motor vehicle.

In order to avoid this potential damaging situation, a brake bound switch 256 of the momentary type is positioned between the outer brake plate 238 and the inner brake plate 210 as is clearly shown in FIG. 4. The brake bound switch 256 is a normally-closed switch which is open-circuited when the inner brake plate 210 and the outer brake plate 238 close upon one another. When this occurs, the normally-closed brake bound switch 256 open circuits interrupting electrical power to the motor 204 which stops the power screw 206 and the movement of the sliding bolt 208. Thus, the brake bound switch 256 senses when the brake pedal 202 is fully deployed to relieve the condition. Furthermore, the brake bound switch 256 also senses if an obstacle is placed in the path of and blocking the brake pedal 202 which creates a similar condition as described hereinabove. The brake bound switch 256 is clearly shown on the electrical control schematic diagram illustrated in FIG. 8 discussed hereinbelow.

Mounted below the power screw 206 is an upper bound column 258 and a lower bound column 260 as is shown in FIG. 5. The upper and lower bound columns 258 and 260, respectively, are employed to provide structural support to an upper bound screw 262 and a lower bound screw 264. The upper bound screw 262 and lower bound screw 264 are each threaded and pass through the rear structural member 214 and the forward structural member 236, respectively, for support. Also, the upper bound screw 262 and the lower bound screw 264 each include a flat head 266 and 268, respectively, adapted for screwdriver adjustment as shown in FIG. 5. The terminal ends of the upper bound and lower bound screws 262 and 264, respectively, each include a blunt head 270 and 272, respectively.

Passing beneath the power screw 206 and the sliding bolt 208 is a guide rod 274. Mounted between the guide rod 274 and the upper bound screw 262 for stability is an upper bound plate 276. Likewise, mounted between the guide rod 274 and the lower bound screw 264 for stability is a lower bound plate 278. Mounted upon the upper bound plate 276 is an upper bound sensor switch 280 and mounted upon the lower bound plate 278 is a lower bound sensor switch 282. The upper and lower bound sensor switches 280 and 282 are each momentary-type switches similar to the brake bound switch 256. The upper bound sensor switch 280 is a normally-closed switch which senses when the brake (or clutch) pedal 202 is fully deployed. Thus, when the power screw 206 drives the sliding bolt 208 into the fully deployed position, the upper bound sensor switch 280 is depressed by the sliding bolt 208. The depressed upper bound sensor switch 280 interrupts the electrical power to the motor 204 terminating the rotation of the power screw 206. This action prevents the sliding bolt 208 from traveling through the rear structural member 214 and causing damage.

The lower bound sensor switch 282 is also a normally-closed switch which senses when the brake (or clutch) pedal 202 is not deployed, e.g., the normal condition. Thus, when the power screw 206 drives the sliding bolt 208 into the non-deployed position, the lower bound sensor switch 282 is depressed by the sliding bolt 208 at the opposite extreme of the power screw 206. The depressed lower bound sensor switch 282 interrupts the electrical power to the motor 204 terminating the rotation of the power screw 206. This action prevents the sliding bolt 208 from traveling through the forward structural member 236 and causing damage.

In order for the motor 204 to be stopped at the appropriate time, each of the upper bound and lower bound plates 276 and 278, respectively, must be properly positioned. Therefore, adjustments must be made to the brake actuator module 120 and clutch actuator module 122 for each vehicle in which the automated system 100 is installed. The adjustments serve to accommodate the automated system 100 for the different brake (or clutch) systems and different brake (or clutch) pedals 202. Under normal conditions, the brake (or clutch) actuator module 120 is not deployed and the lower bound sensor switch 282 is closed. In order to adjust the position of the lower bound sensor switch 282, the flat head 268 accommodates a screwdriver adjustment to move the lower bound plate 278 along the lower bound screw 264 and the guide rod 274. This adjustment (a) sets the trip position of the lower bound sensor switch 282 by the sliding bolt 208 for different brake pedals 202, and (b) prevents the sliding bolt 208 from traveling through the forward structural member 236.

Under alarm conditions, the brake (or clutch) actuator module 120 is fully deployed and the upper bound sensor switch 280 is closed. In order to adjust the position of the upper bound sensor switch 280, the flat head 266 accommodates a screwdriver adjustment to move the upper bound plate 276 along the upper bound screw 262 and the guide rod 274. This adjustment (a) sets the trip position of the upper bound sensor switch 280 by the sliding bolt 208 for different brake pedals 202, (b) prevents the sliding bolt 208 from traveling through the rear structural member 214, and (c) also serves to prevent the brake (or clutch) pedal 202 from being pulled through the floor board of the vehicle.

Figure 6:
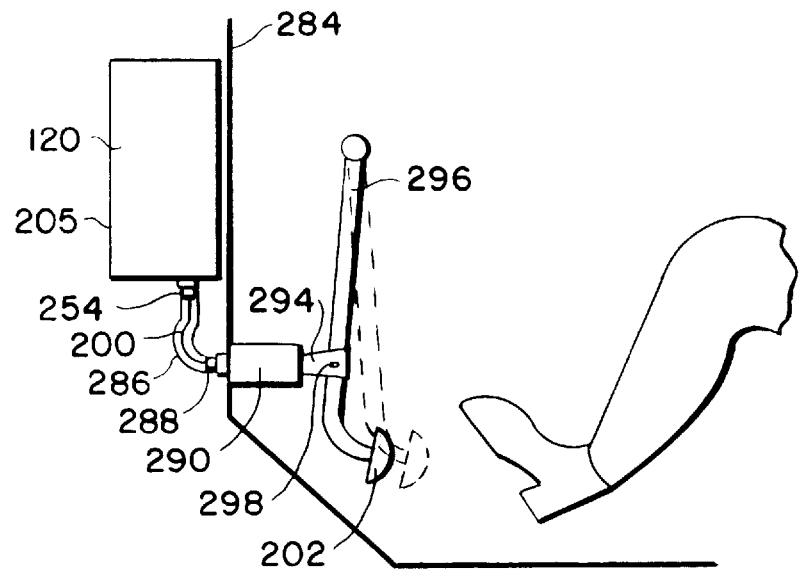
FIG. 6 is a side elevational view of an enclosure housing a brake and/or clutch adjustable range actuator module utilized for automatically deploying a brake and/or clutch foot pedal of the vehicle.

In FIG. 6, the brake (or clutch) actuator module 120 is by way of example shown mounted to the back of a firewall 284 of the vehicle. The wire cable 200 is shown passing through the brake (or clutch) actuator housing 205 via the first cable sleeve 254 and into a protective sheath 286. The wire cable 200 passes through the protective sheath 286 and a second cable sleeve 288 into a protective enclosure 290 which shields the wire cable 200 (shown best in FIG. 7). The protective enclosure 290 serves to prevent the unauthorized driver from cutting the wire cable 200 with heavy-duty cutting equipment or a hacksaw device at a location where the wire cable 200 might otherwise be exposed. The protective enclosure 290 is typically attached to the floor board of the vehicle with bolts or other suitable means and prevents casual defeating of the brake (or clutch) actuator module 120.

Figure 7:
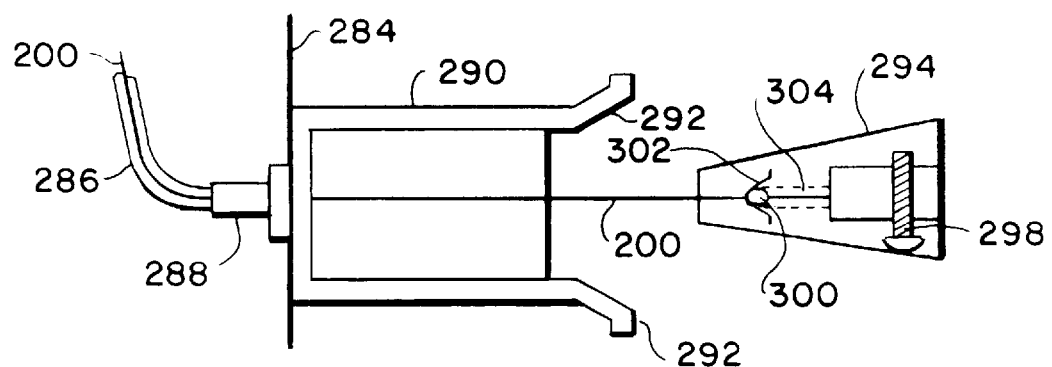
FIG. 7 is a top planar view of a cable sheath and guide designed to protect a cable connected between the brake and/or clutch adjustable range actuator module and a connection bracket physically attached to the foot pedal shown in FIG. 6.

The protective enclosure 290 is comprised of tempered sheet metal or other high strength material and includes a flared front end 292. The flared front end 292 accommodates a heavy-duty steel bracket 294 which is securely attached to a brake (or clutch) pedal arm 296 with, for example, a steel bolt 298 as shown in FIG. 7. The wire cable 200 is shown terminating within the steel bracket 294 by firmly attaching a spherical object 300 to the wire cable 200. A recess 302 shaped at the end of a channel 304 formed through the steel bracket 294 captures the spherical object 300 as shown in FIG. 7. Thus, the wire cable 200 is securely attached to the steel bracket 294. Note that the brake pedal arm 296 is shown in both the non-deployed condition (in phantom) and in the deployed condition after the brake (or clutch) actuator module 120 is actuated.

When a triggering signal is received from the exterior triggering device 104, the microprocessor 124 instructs the clutch actuator module 122 and then the brake actuator module 120 to activate. The brake actuator module 120 will typically be in the reset position for normal, e.g., not deployed, operation wherein the sliding bolt 208 is positioned at the right end (as seen in FIGS. 4 and 5) of the power screw 206. The wire cable 200 is under some tension since the brake pedal 202 is not depressed. This condition causes the inner and outer brake plates 210 and 238, respectively, to be located immediately adjacent to the blunt ends 252 of the parallel arms 232 of the sliding bolt 208. Further, the pair of cable tension springs 250 shown in FIG. 4 are extended in an effort to pull the inner and outer brake plates 210 and 238 in the direction of the forward structural member 236.

Under normal conditions when the brake (or clutch) pedal is depressed, the sliding bolt 208 continues to be positioned at the right end (as seen in FIGS. 4 and 5) of the power screw 206. However, the depressing of the brake pedal 202 places slack in the wire cable 200 resulting in the pair of cable tension springs 250 pulling the inner and outer brake plates 210 and 238, respectively, in the direction of the forward structural member 236.

After the brake (or clutch) actuator module 120 has been deployed, the motor 204 is energized which rotates the power screw 206 via the gear train. The power screw 206 drives the sliding bolt 208 in the direction of the gear train (as seen in FIGS. 4 and 5) placing a tension on the wire cable 200. The tension in the wire cable 200 causes the brake (or clutch) pedal 202 to be depressed which engages the brakes (or clutch) of the vehicle and the vehicle stops. Upon further rotation of the power screw 206 by the motor 204, the force applied by the wire cable 200 and wire anchor point 246 on the outer brake plate 238 combined with the force applied by the pair of cable tension springs 250 to the inner brake plate 210 exceeds the resistance of the pair of compression springs 244. Consequently, the inner brake plate 210 and the outer brake plate 238 are forced together opening the normally-closed brake bound switch 256. The motor 204 is then de-energized and the power screw 206 ceases to rotate. The brakes and clutch remain in the deployed condition and the stolen vehicle cannot be moved.

Figure 8:
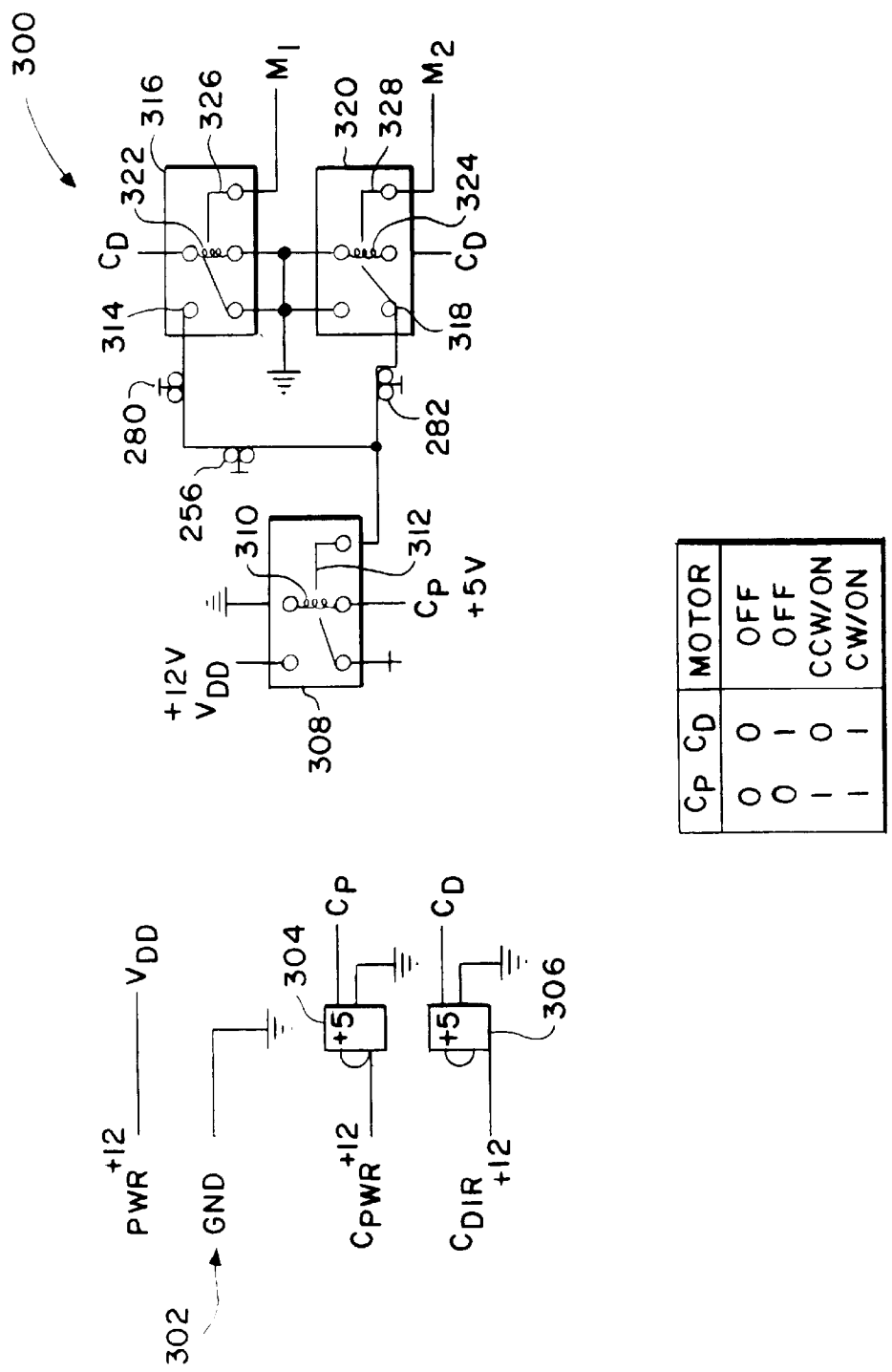
FIG. 8 is a schematic diagram of the electrical control circuit for the automated system for immobilizing a vehicle of FIG. 1.

A motor control circuit 300 for the automated system 100 is shown in FIG. 8. It is noted that there is a separate motor control circuit for each of the adjustable range actuator modules whether they are of the throttle, brake or clutch variety. The motor control circuit 300 is typically located within the throttle actuator housing 148 for the throttle actuator module 118 shown in FIGS. 3A–C. However, the motor control circuit 300 for the brake actuator module 120 (or clutch actuator module 122) is located within the brake actuator housing 205 (or equivalent clutch actuator housing) shown in FIGS. 4 and 5.

A terminal pad 302 is provided for each motor 204 which comprises four electrical input wires carrying power and control signals. The terminal pad 302 is clearly shown in FIG. 8. The four input signals are shown as monitored parameters delivered to the input ports 128 of the central control 102 in FIG. 2 for controlling operation of the motor 204. Also, the four input signals are shown as inputs circuited to the motor 204 in the brake actuator housing 205 in FIG. 4. The four input signals appearing on the terminal pad 302 include the 12 volt direct current power (PWR) supply designated "$V_{DD}$", an electrical ground connection "GND", a 12 volt power control signal designated "$C_{PWR}$" and a 12 volt direction control signal designated "$C_{DIR}$".

The motor control circuit 300 comprises a first voltage regulator 304 for regulating the control power signal from +12 volts d.c. to +5 volts d.c. A second voltage regulator 306 regulates the control direction signal from +12 volts d.c. to +5 volts d.c. The regulation is completed in a manner well known in the art. Thus, terminal pad 302 now provides the +12 volt d.c. power input "$V_{DD}$", the +5 volt d.c. control power signal designated "$C_P$" and the +5 volt d.c. control direction signal designated "$C_D$" to the motor control circuit 300 as shown in FIG. 8.

The motor control circuit 300 also comprises a plurality of three grounded relays and the three momentary-type mechanical push button switches including the brake bound switch 256, the upper bound sensor switch 280 and the lower bound sensor switch 282 discussed in conjunction with the brake (and clutch) actuator module 120 in FIGS. 4 and 5. The first of the three relays is a power relay 308 which is rated for a throughput voltage of up to 250 volts d.c. However, the voltage necessary to operate the coil 310 of the power relay 308 is +5 volts d.c. The power relay 308 is shown in FIG. 8 as receiving the +12 volt d.c. power input "$V_{DD}$" and the +5 volt d.c. regulated control power input "$C_P$" and is also connected to electrical ground. When the +12 volt d.c. threshold voltage and control signal "C" are present, the relay coil 310 energizes causing a throughput terminal 312 to close and relay 308 to conduct and function like a switch.

As a result of the conduction of power relay 308, +12 volts d.c. is placed upon the input terminals 314 of a first direction control relay 316 and the input terminals 318 of a second direction control relay 320 as shown in FIG. 8. Each of the direction control relays 316 and 320, respectively, exhibit the same construction and operate in the same manner as that of the power relay 308. Thus, the throughput voltage of relays 316 and 320 is up to 250 volts d.c. with each having a relay coil 322 and 324, respectively and a throughput terminal 326 and 328, respectively.

The input signals delivered to first and second directional control relays 316 and 320 include the +12 volt d.c. input from power relay 308 and the +5 volt d.c. control direction signal "$C_D$" and each relay 316 and 320 is connected to electrical ground. When the +12 volt d.c. threshold voltage and control signal "$C_D$" are present at either one or both of the first or second direction control relay 316 or 320, respectively, the appropriate relay coil 322 and/or 324 energizes causing the appropriate throughput terminal 326 and/or 328 to close. This action determines which motor terminal "$M_1$" or "$M_2$" shown in FIG. 8 is energized and consequently controls the voltage polarity and the direction of rotation of the universal motor 204. A "Truth Table" is included in FIG. 8 which enables one to determine the direction of rotation of the motor 204 based upon the wiring of the motor control circuit 300 and upon which controls signals, e.g., "$C_P$" and/or "$C_D$", are present.

It is noted that the momentary-type switches including the brake bound switch 256, and the upper and lower bound sensor switches 280 and 282, respectively, are connected in series between the power relay 308 and the first and second directional control relays 316 and 320, respectively. The momentary-type switches are present to interrupt the power supply to the motor 204 under the conditions previously discussed in conjunction with the brake (or clutch) actuator module 120.

It is noted that once the automated system 100 is activated, it remains active. The +12 volt d.c. power supply needed to operate the motor control circuit 300 can be obtained from either the vehicle battery or it can be provided by a separate battery. Under these conditions, the power source for the automated system 100 can be recharged when the vehicle ignition is switched-on and then be completely separate from the vehicle electrical system when the ignition is switched-off by employing a plurality of known transistor and relay circuits to prevent short circuiting of the automated system 100 when the vehicle is parked.

FIGS. 9 and 10 set forth the flow diagrams for the situations in which (a) the automated system 100 is activated while the stolen vehicle is moving, and (b) the automated system 100 is activated while the vehicle is parked. Each of the steps of these flow diagrams has been exhaustively discussed in the present specification. In FIG. 9, the audio control module 110 is instructed to disconnect the vehicle sound system 114 so that the warning systems controller 116 can announce warnings to the unauthorized driver. Next, the vehicle throttle is disabled since the vehicle is moving. Once the safety parameters [e.g., less than 15 mph and greater than one minute elapsed time] have been satisfied, the vehicle clutch and brake systems are deployed. The vehicle is then stopped with the motor running. In FIG. 10, the warning systems controller 116 issues the appropriate warnings and the vehicle throttle is disabled to prevent the vehicle from accelerating and moving under the power of the engine. Thereafter, the vehicle brakes are deployed and the parked vehicle is immobilized.

The present invention provides novel advantages over other vehicle security systems known in the art. Main advantages include the automatic disabling of the vehicle throttle and deployment of the vehicle brakes and clutch. This action is accomplished without the need to directly disable the vehicle engine so that the unauthorized driver, who may be a carjacker, is frustrated in the theft after the vehicle has been taken.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention. Accordingly,

What is claimed is:

1. An automated system for immobilizing a vehicle comprising:

first means for monitoring a plurality of parameters of said vehicle and for generating a triggering signal;

a central control microprocessor for receiving said plurality of parameters and for detecting said triggering signal;

a throttle adjustable range actuator module for disabling an accelerator pedal of said vehicle upon detection of said triggering signal from said microprocessor, said throttle actuator module including an electrically operated solenoid for positioning a vertically movable pulley to control the tension in an accelerator cable, wherein reduced tension in said accelerator cable disables said accelerator pedal without disabling the engine of said vehicle; and A brake adjustable range actuator module for deploying a braking system of said vehicle upon detection of said triggering signal from said microprocessor, said brake actuator module including an electrically operated motor and a plurality of gears for positioning a threaded sliding bolt along a rotatable threaded shaft to control the tension in a wire cable attached to a brake pedal of said vehicle, wherein increased tension in said wire cable depresses said brake pedal and deploys said braking system to stop said vehicle.

2. The automated system of claim 1 wherein said first means monitors a speedometer of said vehicle for indicating the speed of said vehicle.

3. The automated system of claim 1 wherein said first means monitors incoming signals from an external triggering device.

4. The automated system of claim 1 wherein said first means monitors a reset keypad/receiver for imputing instructions into said central control microprocessor.

5. The automated system of claim 1 further including an audio control relay for disconnecting a vehicle sound system from a vehicle audio power supple for muting said vehicle sound system to enable the audio broadcast of a plurality of audio and sensory warnings from a warning systems controller.

6. The automated system of claim 1 further including a clutch adjustable range actuator module for disengaging the clutch of said vehicle upon detection of said triggering signal from said microprocessor, said clutch actuator module including an electrically operated motor and a plurality of gears for positioning a threaded sliding bolt along a rotatable threaded shaft to control the tension in a wire cable attached to a clutch pedal of said vehicle, wherein increased tension in said wire cable depresses said clutch pedal for deploying the clutch of said vehicle.

7. An automated system for immobilizing a vehicle comprising:
   first means for monitoring a plurality of parameters of said vehicle and for generating a triggering signal;
   a microprocessor for receiving said plurality of parameters and for detecting said triggering signal;
   a throttle adjustable range actuator module for disabling an accelerator pedal of said vehicle upon detection of said triggering signal from said microprocessor, said throttle actuator module including an electrically operated solenoid for positioning a vertically movable pulley to control the tension in an accelerator cable, wherein reduced tension in said accelerator cable disables said accelerator Pedal without disabling the engine of said vehicle;
   a brake adjustable range actuator module for deploying a braking system of said vehicle upon detection of said triggering signal from said microprocessor, said brake actuator module including an electrically operated motor and a plurality of gears for positioning a threaded sliding bolt along a rotatable threaded shaft to control the tension in a wire cable attached to a brake pedal of said vehicle, wherein increased tension in said wire cable depresses said brake pedal and deploys said braking system to stop said vehicle; and
   a plurality of sensor switches Positioned within said brake actuator module for limiting the travel of said threaded sliding bolt along said rotatable threaded shaft.

8. A method for automatically immobilizing a vehicle, said method comprising the steps of:
   monitoring a plurality of parameters of said vehicle and generating a triggering signal;
   receiving and detecting said triggering signal at a central control microprocessor in said vehicle;
   muting a sound system located within said vehicle;
   activating a warning systems controller within said vehicle for enabling the broadcast of a plurality of audio and sensory warning messages;
   disabling an accelerator pedal of said vehicle by positioning a vertically movable pulley with an electrically operated solenoid for controlling the tension in an accelerator cable; and
   deploying the brakes of said vehicle to stop said vehicle by positioning a threaded sliding bolt along a rotatable threaded shaft using a motor and a plurality of gears for controlling the tension in a wire cable attached to a brake pedal.

* * * * *